(12) United States Patent
Kelley

(10) Patent No.: US 6,419,072 B2
(45) Date of Patent: Jul. 16, 2002

(54) BELT TRANSFER SYSTEM

(75) Inventor: Reginald D. Kelley, Lebanon, OH (US)

(73) Assignee: Force Control Industries, Inc., Fairfield, OH (US)

(*) Notice: Subject to any disclaimer, the term of this patent is extended or adjusted under 35 U.S.C. 154(b) by 0 days.

(21) Appl. No.: 09/844,315

(22) Filed: Apr. 27, 2001

Related U.S. Application Data

(63) Continuation-in-part of application No. 09/303,511, filed on May 3, 1999, now Pat. No. 6,223,611.

(51) Int. Cl.[7] ............................................. B65G 37/00
(52) U.S. Cl. ..................................................... 198/346.1
(58) Field of Search .......................... 198/346.1, 346.2; 414/222.07, 222.09–222.12; 29/33 P

(56) References Cited

U.S. PATENT DOCUMENTS

| | | | |
|---|---|---|---|
| 3,381,744 A | * | 5/1968 | Taccone .................. 198/346.1 |
| 3,952,861 A | | 4/1976 | Holmqvist et al. |
| 4,133,423 A | * | 1/1979 | Zankl ....................... 198/346.1 |
| 4,411,182 A | | 10/1983 | Borzym |
| 4,518,303 A | | 5/1985 | Moser |
| 4,995,502 A | * | 2/1991 | Kitamura .................. 198/346.1 |
| 5,054,175 A | * | 10/1991 | Date ......................... 198/346.1 |
| 5,131,125 A | * | 7/1992 | Coron ....................... 198/346.1 |
| 5,156,254 A | * | 10/1992 | Kitamura et al. ........ 198/346.1 |
| 5,242,039 A | | 9/1993 | Mabee |
| 5,829,572 A | * | 11/1998 | Faraoni et al. ........... 198/346.1 |

* cited by examiner

Primary Examiner—Joseph E. Valenza
(74) Attorney, Agent, or Firm—Jacox, Meckstroth & Jenkins

(57) ABSTRACT

A plurality of flat timing belts each has parallel spaced teeth, and opposite end portions of each belt are attached to a carriage by corresponding relatively adjustable clamping blocks and plates. The belts extend around a common drive sprocket on a drive shaft connected to a drive having a reversible electric motor. The belts also extend around corresponding tail sprockets on a tail shaft, and adjacent tail sprockets are free to rotate relative to each other. A clamping block for each belt is adjusted to obtain the same tension in all belts so that each belt may be operated at its full rated capacity. The belt drive system may be used for transferring or shuttling a plurality of tool trays laterally with respect to a working station at a conveyor assembly line and storage stations on opposite sides of the working station.

20 Claims, 2 Drawing Sheets

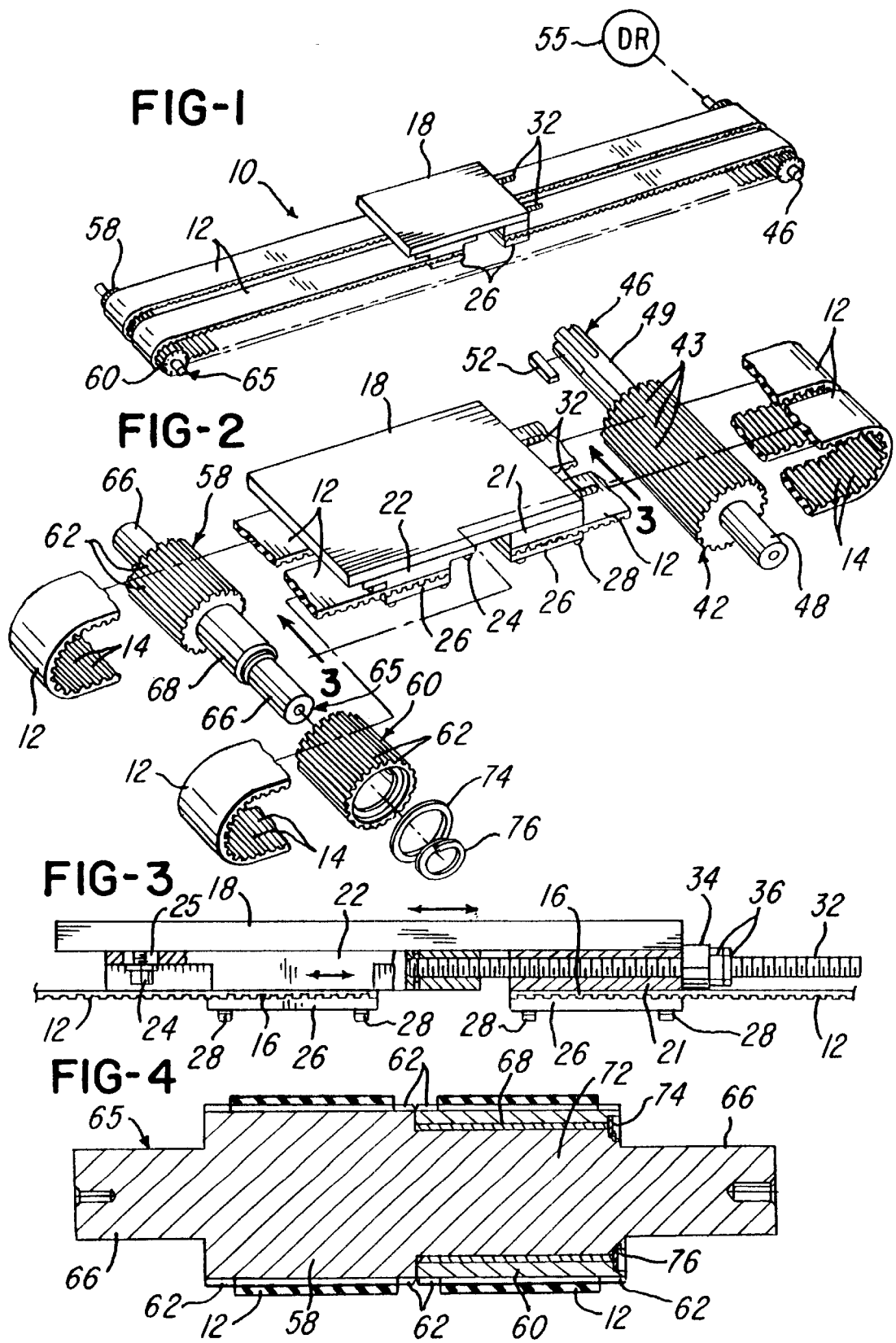

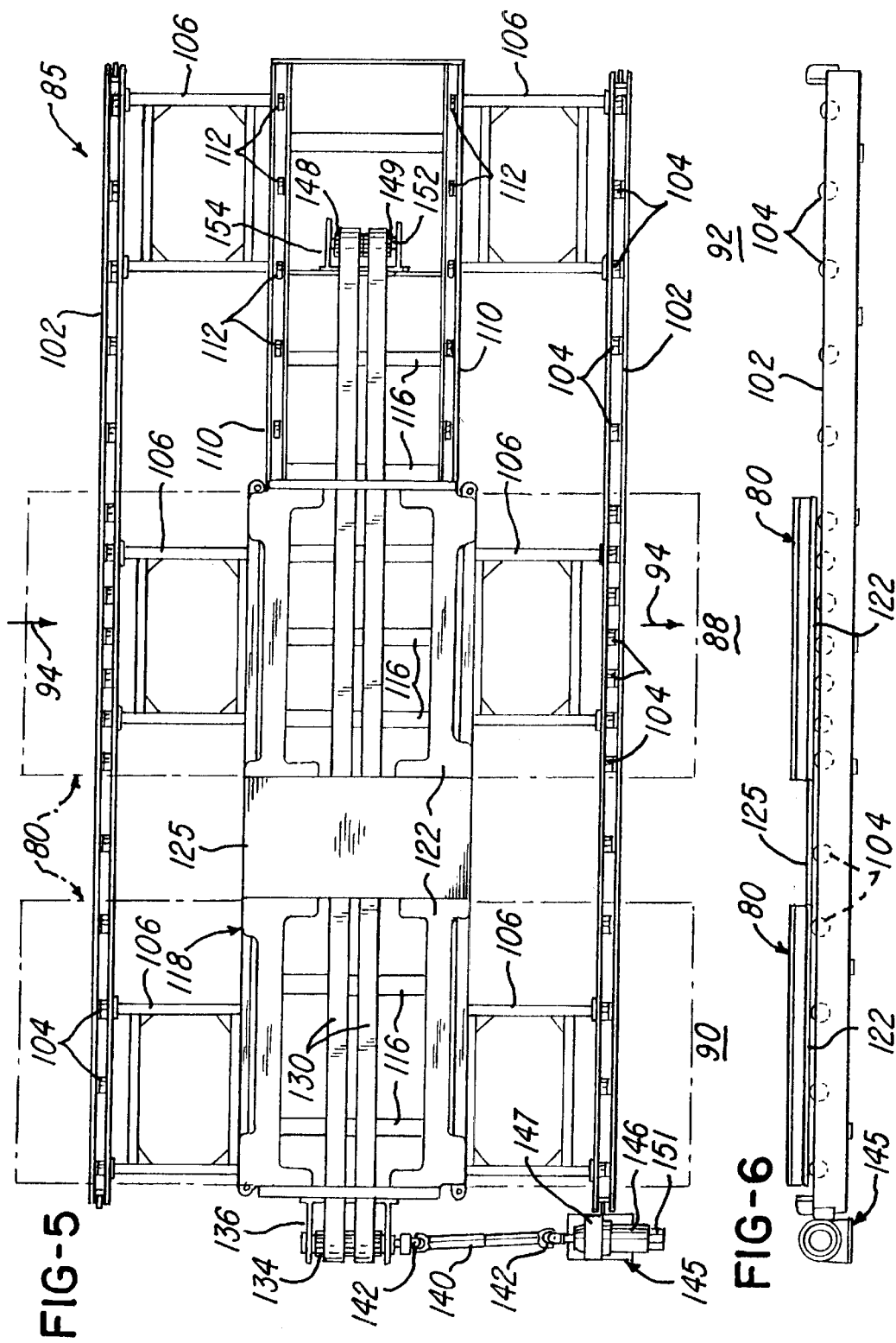

BELT TRANSFER SYSTEM

RELATED APPLICATION

This application is a continuation-in-part of application Ser. No. 09/303,511, filed May 3, 1999, U.S. Pat. No. 6,223,611.

BACKGROUND OF THE INVENTION

In the rapid transfer and positioning of a shuttle or carriage which is supported for reciprocating linear movement, it is known to use an endless or open-ended flat flexible timing belt having longitudinally spaced parallel teeth. The toothed belt extends around a drive sprocket having mating teeth and connected to a drive shaft which is driven by a reversible drive. The toothed timing belt also extends around an idler or tail sprocket having mating teeth and rotatably supported by a tail shaft which extends parallel to the drive shaft. The spacing between the drive shaft and the tail shaft determine the extent of linear travel of the carriage which is commonly supported by parallel spaced tracks.

When the shuttle or carriage positioning and transfer system or apparatus is used for rapidly moving a substantial load, for example, when used with automotive assembly machinery for moving components of automotive vehicles, the load carrying capacity of the timing belt usually determines the load moving capacity of the shuttle or carriage. If two timing belts are used to move a shuttle or carriage, the variation in the belts due to production tolerances, results in one of the belts carrying a greater portion of the load than the other belt. Thus if the one belt is operated at its full rated capacity, the second belt does not significantly increase the load carrying capacity of the belt system, and primarily offers only a safety factor.

SUMMARY OF THE INVENTION

The present invention is directed to an improved carriage transfer and positioning system or apparatus which provides for rapidly moving a carriage which is capable of supporting or moving a substantial load along a linear path and for precisely positioning the carriage at predetermined locations along the linear path. In accordance with one embodiment of the invention, a plurality of flat toothed timing belts are positioned in laterally adjacent relation, and each belt has opposite end portions or adjacent portions connected to the carriage by means of relative adjustable belt clamping blocks and plates. The belts extend around a common toothed drive sprocket connected to a head or drive shaft driven by a multiple speed drive preferably having multiple electric motors and oil-shear clutch and brake discs.

The belts also extend around separate or corresponding toothed tail sprockets supported by a tail shaft and wherein the tail sprocket for one belt is free to rotate relative to the adjacent tail sprocket for the other belt. The tension in each belt is adjusted by relative movement by the corresponding clamping blocks in order to obtain substantially equal or uniform tension in the drive belts. The multiple flat toothed belts not only provide a safety factor but provide for moving a substantially greater load with the carriage by operating each belt at its full rated capacity. In one application, one or more of the timing belts are connected to transfer a carriage connected to a plurality of tool trays for shuttling or indexing the trays laterally relative to a product flow or assembly line between storage and working positions or stations. The drive for the belt or belts is located at one end of the belt transfer system to provide the system with a low profile.

Other features and advantages of the invention will be apparent from the following description, the accompanying drawings and the appended claims.

BRIEF DESCRIPTION OF THE DRAWINGS

FIG. 1 is a diagrammatic perspective view of carriage transfer and positioning apparatus constructed in accordance with the invention;

FIG. 2 is a fragmentary exploded view of the apparatus shown in FIG. 1;

FIG. 3 is a fragmentary section of the apparatus, taken generally on the line 3—3 of FIG. 2;

FIG. 4 is an axial section of the tail shaft and sprocket assembly shown in FIGS. 1 & 2.

FIG. 5 is a diagrammatic plan view of a transfer system constructed in accordance with the invention for transferring tool trays laterally relative to a product assembly line; and FIG. 6 is a side elevation view of the transfer system shown in FIG. 5.

DESCRIPTION OF THE PREFERRED EMBODIMENT

FIG. 1 illustrates diagrammatically a belt positioning and transfer system or apparatus 10 which includes a plurality or pair of flexible flat timing belts 12 each having parallel spaced and laterally extending teeth 14. Preferably, each toothed belt 12 is open-ended and has opposite end portions 16 (FIG. 3) connected to a carriage member or platform 18 by a fixed attachment block or belt clamping block 21 and an adjustable attachment block or belt clamping block 22. The block 21 is rigidly secured to the platform 18, and the block 22 is connected to the platform by a set of four screws 24 which extend through slots 25 within the block 22 to provide for adjustment of the block 22 relative to the block 21 and the platform 18. The opposite end portions 16 of each belt 12 are positively attached to the blocks 21 and 22 by corresponding clamping plates or belt gripping members 26 and a set of four screws 28. Each of the clamping plates 26 has parallel spaced teeth which mate with and engage the teeth 14 on the corresponding belt 12 to provide a high strength and positive connection of the belt end portions to the carriage platform 18.

As shown in FIGS. 2 & 3, a threaded adjusting bolt or rod 32 extends through a clearance bore within each belt attachment block 21 for each belt 12 and has an inner end portion threadably connected to the corresponding adjustable belt attachment block 22. A thrust washer 34 is mounted on each adjustment rod 32, and a set of jamb nuts 36 are threaded onto the rod adjacent the washer 34. In order to adjust and select the tension in each belt 12, the screws 24 are loosened, and the nuts 36 are rotated to adjust the belt attachment block 22 relative to the belt attachment block 21. After the desired tension is obtained, the screws 24 are again tightened.

Referring to FIGS. 1 & 2, the two adjacent drive belts 12 extend around a toothed drive pulley or sprocket 42 having peripherally spaced teeth 43 which engage the teeth 14 on the two belts 12. The sprocket 42 is integrally connected to a head or drive shaft 46 having opposite end journals 48 and 49 which are rotatably supported by anti-friction bearings (not shown) retained within a housing or bracket (not shown). The drive shaft 46 is coupled with a key 52 to the output shaft of multiple speed drive 55 preferably having two electric motors and a set of oil-shear clutch discs and a set of oil-shear brake discs which are actuated separately by air pistons or electromagnetic coils. For example, the drive 55 may be constructed as disclosed in U.S. Pat. No. 5,242,039 which is owned by the assignee of the present invention and the disclosure of which is herein incorporated by reference. Preferably, the drive shaft 46, including the journals 48 and 49, and the sprocket 42 are all formed from a one-piece solid steel cylindrical bar or rod.

As also shown in FIGS. 1 & 2, the belts 12 extend around separate or corresponding tail pulleys or sprockets 58 and 60 each of which has peripherally spaced teeth 62 which mate with the teeth 14 on the belts 12. Referring to FIG. 4, the sprocket 58 is formed as an integral part of a tail shaft 65 which has opposite end journals 66 rotatably supported by anti-friction bearings (not shown) retained within a housing or bracket (not shown). The tail sprocket 60 is annular and is rotatably supported by a cylindrical sleeve bushing or bearing 68 mounted on a reduced cylindrical portion 72 of the tail shaft 65. Thus the tail sprocket 60 is free to rotate on the tail shaft 65 and relative to the tail sprocket 58 formed as an integral part of the tail shaft 65. The annular tail sprocket 60 and bearing 68 are retained on the reduced shaft portion 72 by a thrust washer 74 and a retaining ring 76.

As a result of the slight variations in the belts 12 due to manufacturing tolerances, it is apparent that the free rotation of the tail sprocket 60 relative to the tail sprocket 58 provides for independently adjusting the tension in each belt 12. Thus the belts may be adjusted to the same tension by adjusting each attachment block 22 relative to its corresponding attachment block 21 with the adjustment nuts 36 on the corresponding connecting rod 32. When both of the belts are operated at substantially the same tension, the load is distributed uniformly on the belts. Thus the load carrying capacity of the belts 12 may be combined in order to transfer and position a substantial load without exceeding the rated capacity of any belt.

The freely rotatable tail sprocket 60 also permits easier assembly of the belts 12 onto the head or drive shaft 46 and the tail shaft 65. As indicated above, it is also apparent that more than two toothed timing belts 12 and corresponding tail sprockets 60 may be used along with a longer drive shaft 46 and tail shaft 65 in order for the carriage to transfer and position an even greater load. While the timing belts 12 are illustrated and described as being open-ended belts, it is also apparent that each belt may be endless and have a slight loop between the corresponding attachment plates 26.

FIGS. 5 & 6 illustrate an application and use of a belt transfer system constructed in accordance with the invention and wherein a plurality of tooling trays 80 are supported by a transfer apparatus 85 for transferring or shuttling the tooling trays laterally between a center working position or station 88 and two tray storage positions or stations 90 and 92 on opposite sides of the working station 88. When one of the tooling trays 80 is located at the center working station 88, it is aligned with an assembly conveyor line having a centerline and direction of flow as shown by the arrows 94. A tooling tray 80 may be any large and/or heavy tray or platform or frame which carries an article or apparatus to be used on the assembly line. A typical tooling tray may include a fixture which supports and clamps a motor vehicle body part, for example, a body side panel or floor panel and may be of substantial size and/or weight. For example, a tray may have a width over 6', a length over 15' and a total weight of over 10,000 pounds. The total weight may include 2,000 pounds for the tray and 8,000 pounds for a fixture or tooling. The trays 80 may be of other sizes and support different articles, depending upon what is required of the working station 88 to assemble one or more parts on the conveyor assembly line.

Since the tooling trays 80 usually have substantial size and weight, as mentioned above, the transfer system or apparatus 85 includes a set of parallel spaced outer rails 102 which extend laterally across the assembly flow line 94 and have substantial length, for example, over 25'. Each of the rails 102 has a series of longitudinally spaced rollers 104 which support the opposite end portions of the tooling trays 80 for lateral movement between the working station 88 and the storage stations 90 & 92. The outer rails 102 are rigidly connected by a series of longitudinally spaced cross frames 106 to a set of parallel spaced inner rails 110 which extends substantially the same length as the rails 102, with each rail 110 having a series of longitudinally spaced support rollers 112. The rails 110 are rigidly connected by a series of longitudinally spaced cross frame members 116, and the rollers 112 support an elongated carriage 118 for longitudinal movement along the rails 110.

The carriage 118 includes a set of rectangular sled or carriage sections 122 each of which is supported for lateral movement relative to the center flow line 94 by the rollers 112, and each carriage section 122 supports the center portion of the corresponding tooling tray 80. Preferably, a set of tapered pins (not shown) project upwardly from each carriage section 122 into corresponding alignment holes within the corresponding tooling tray 80 for precisely positioning the tooling tray on the carriage section and permit the tray to be lifted from its supporting carriage section. The carriage 118 also includes a center carriage section or platform 125 which rigidly connects the carriage sections 122 and has belt clamping and adjustment components similar to the components on the carriage platform 18 described above in connection with FIGS. 1–4.

A plurality or pair of flexible flat timing belts 130 (FIG. 5) are constructed the same as the belts 12 described above, and each belt 130 has opposite end portions connected to the center carriage section or platform 125 in the same manner as described above for connecting the opposite end portions of the belts 12 to the carriage platform 18. As shown in FIG. 5, the belts 130 extend around a drive sprocket 134 which is constructed the same as the drive sprocket 42 described above and is supported for rotation by a pair of arms or brackets 136 projecting laterally outboard of an end frame member connecting the inner rails 110. The drive sprocket 134 is connected by a drive shaft 140 and universal joints 142 to a belt drive unit 145 including a reversible electric motor 146 having a gear reducer 147 on one end and a motor brake 151 on the opposite end. The drive shaft 140 may also be driven by a multiple speed and reversible drive unit such as the drive unit 55 described above.

The elongated belts 130 also extend around corresponding tail sprockets 148 and 149 supported for relative rotation. Preferably, the sprocket 148 is formed as an integral part of a tail shaft 152, and the tail sprocket 149 is supported for relative rotation by the tail shaft 152, in the same manner as described above in connection with the tail sprockets 58 & 60. The tail shaft 152 is rotatably supported by a set of brackets or arms 154 under the storage station 92 by one of the cross frame members connecting the inner rails 110. As described above in connection with FIGS. 14, the tension in each of the belts 130 may be selected or adjusted so that both belts have the same tension and carry the same load in order to provide the belts with an extended service life.

As apparent from FIG. 5, when the belts 130 are driven in one direction or to the right by the drive 145, the tooling tray 80 at the center working position or station 88 is shifted or shuttled laterally to its storage position 92 while the tooling tray 80 at the storage station 90 is shifted to the center working station 88 by movement of the carriage 118. It is also apparent that if the assembly line required three tooling trays 80 each to be used at the center working station 88, two storage positions or stations would be required on each side of the center working station 88. This would require that the transfer apparatus 85 be made longer with two storage stations on each side of the working station. It is also to be understood that if the tooling trays 80 do not have substantial weight, only one of the flexible timing belts 130 may be necessary for transferring or shuttling the tooling trays between the center working station and the side storage stations. The location of the drive 145 and drive sprocket 134 at the end of the transfer apparatus 85 provides the apparatus with a low profile, for example, under two feet. Such a low profile is frequently desirable for use of the apparatus with a conveyor assembly line having a low profile. It is also within the scope of the invention to use linear bearings and precision rail assemblies in place of the rails 102 and/or 110 and corresponding rollers 204 and 112 to support the carriage 118 and tooling trays 80 for lateral movement with minimum friction.

While the forms of transfer and positioning apparatus herein described constitute preferred embodiments of the invention, it is to be understood that the invention is not limited to these precise forms of apparatus, and that changes may be made therein without departing from the scope and spirit of the invention as defined in the appended claims.

What is claimed is:

1. Transfer apparatus adapted for selectively moving at least two tooling trays laterally between a working station adjacent a moving assembly line and one of two storage stations on opposite sides of said working station, said apparatus comprising a carriage member adapted to be connected to said tooling trays and supported for lateral horizontal movement relative to the direction of movement of the assembly line, at least one elongated flexible belt having longitudinally spaced teeth and extending parallel to the lateral movement of said carriage member and between said storage stations through said working station, a belt gripping member connecting a portion of said belt to said carriage member, said belt extending around a toothed drive sprocket rigidly connected to a drive shaft adjacent one of said storage station, a power operated reversible drive adjacent said one storage station and connected to rotate said drive shaft in opposite directions, and said belt also extending around a tail sprocket supported by a tail shaft adjacent the other said storage station.

2. Apparatus as defined in claim 1 and including a plurality of said belts and a corresponding plurality of said belt gripping members connected to said carriage member, an adjustment member for moving one of said belt gripping members for each said belt relative to the other said belt gripping member for adjusting the tension in said belt, each of said belts extending around said drive sprocket and around a corresponding said tail sprocket on said tail shaft, and one of said tail sprockets being supported by said tail shaft for rotation relative to the other said tail sprocket.

3. Apparatus as defined in claim 2 wherein each of said belts has opposite end portions clamped by corresponding said gripping members to said carriage member.

4. Apparatus as defined in claim 2 wherein one of said belt gripping members for each said belt comprises a belt clamping plate having parallel spaced teeth engaging said teeth on said belt.

5. Apparatus as defined in claim 2 wherein said adjustment member for each said belt comprises a threaded rod connected to a belt clamping block and extending in the direction of linear movement of said carriage member.

6. Apparatus as defined in claim 2 wherein one of said tail sprockets for one of said belts is integral with said tail shaft, and the other said tail sprocket is rotatable on said tail shaft.

7. Apparatus as defined in claim 1 wherein said reversible drive comprises a multiple speed drive unit including a plurality of electric motors, a stack of oil-shear clutch discs, and a stack of oil-shear brake discs.

8. Apparatus as defined in claim 1 wherein said drive shaft and said power operated drive are disposed laterally outboard of said one storage station to provide said apparatus with a low profile for use with a low profile assembly line.

9. Apparatus as defined in claim 1 and including a set of parallel spaced elongated inner rails extending parallel to said belt with said belt between said rails, and each of said inner rails having a series of longitudinally spaced rollers supporting said carriage member for movement between said working station and each of said storage stations.

10. Apparatus as defined in claim 1 and including a set of elongated outer rails extending parallel to said inner rails with said inner rails therebetween, and each of said outer rails has a series of longitudinally spaced rollers positioned to support opposite end portions of the tool trays.

11. Transfer apparatus adapted for selectively moving at least two tooling trays laterally between a working station adjacent a moving assembly line and one of two storage stations on opposite sides of said working station, said apparatus comprising a carriage member adapted to be connected to said tooling trays and supported for lateral horizontal movement relative to the direction of movement of the assembly line, a plurality of elongated flexible belts each having longitudinally spaced teeth and extending parallel to the lateral movement of said carriage member and between said storage stations through said working station, an adjustable belt gripping member connecting a portion of each said belt to said carriage member, said belts extending around a toothed drive sprocket rigidly connected to a drive shaft, a power operated reversible drive connected to rotate said drive shaft in opposite directions, and each said belt also extending around a corresponding tail sprocket supported by a tail shaft for relative rotation.

12. Apparatus as defined in claim 11 wherein each of said belts has opposite end portions clamped by corresponding adjustable said gripping members to said carriage member.

13. Apparatus as defined in claim 11 wherein one of said belt gripping members for each said belt comprises a belt clamping plate having parallel spaced teeth engaging said teeth on said belt.

14. Apparatus as defined in claim 11 wherein said adjustable belt gripping member for each said belt comprises a threaded rod connected to a belt clamping block and extending in the direction of linear movement of said carriage member.

15. Apparatus as defined in claim 11 wherein one of said tail sprockets for one of said belts is integral with said tail shaft, and the other said tail sprocket is rotatable on said tail shaft.

16. Apparatus as defined in claim 11 wherein said reversible drive comprises a multiple speed drive unit including a plurality of electric motors, a stack of oil-shear clutch discs, and a stack of oil-shear brake discs.

17. Apparatus as defined in claim 1 wherein said drive shaft and said power operated drive are disposed laterally outboard of said one storage station to provide said apparatus with a low profile for use with a low profile assembly line.

18. Transfer apparatus adapted for selectively moving at least two tooling trays laterally between a working station adjacent a moving assembly line and one of two storage stations on opposite sides of said working station, said apparatus comprising a carriage member adapted to be connected to said tooling trays, a set of elongated rails extending between the storage stations across the working station and supporting said carriage for lateral horizontal movement relative to the direction of movement of the assembly line, at least one elongated flexible belt having longitudinally spaced teeth and extending parallel to the lateral movement of said carriage member and between said storage stations through said working station, a belt gripping member connecting a portion of said belt to said carriage member, said belt extending around a toothed drive sprocket rigidly connected to a drive shaft adjacent one of said storage station, a power operated reversible drive adjacent said one storage station and connected to rotate said drive shaft in opposite directions, and said belt also extending around a tail sprocket supported by a tail shaft adjacent the other said storage station.

19. Apparatus as defined in claim 18 and including a plurality of said belts and a corresponding plurality of said belt gripping members connected to said carriage member, an adjustment member for moving one of said belt gripping members for each said belt relative to the other said belt gripping member for adjusting the tension in said belt, each of said belts extending around said drive sprocket and around a corresponding said tail sprocket on said tail shaft, and one of said tail sprockets being supported by said tail shaft for rotation relative to the other said tail sprocket.

20. Apparatus as defined in claim 19 wherein one of said tail sprockets for one of said belts is integral with said tail shaft, and the other said tail sprocket is rotatable on said tail shaft.

* * * * *